US010243422B2

(12) United States Patent
Minogue

(10) Patent No.: US 10,243,422 B2
(45) Date of Patent: Mar. 26, 2019

(54) SEAL ARRANGEMENT FOR A MOTOR PUMP ASSEMBLY

(71) Applicant: Regal Beloit America, Inc., Beloit, WI (US)

(72) Inventor: Joseph S. Minogue, Springboro, OH (US)

(73) Assignee: Regal Beloit America, Inc., Beloit, WI (US)

(*) Notice: Subject to any disclaimer, the term of this patent is extended or adjusted under 35 U.S.C. 154(b) by 249 days.

(21) Appl. No.: 15/226,569

(22) Filed: Aug. 2, 2016

(65) Prior Publication Data

US 2016/0344251 A1 Nov. 24, 2016

Related U.S. Application Data

(62) Division of application No. 13/790,821, filed on Mar. 8, 2013, now Pat. No. 9,438,080.

(51) Int. Cl.

| | |
|---|---|
| ***H02K 5/10*** | (2006.01) |
| ***H02K 5/124*** | (2006.01) |
| ***H02K 5/173*** | (2006.01) |
| ***F04B 17/03*** | (2006.01) |
| ***F04D 25/08*** | (2006.01) |
| ***H02K 5/16*** | (2006.01) |

(52) U.S. Cl.

CPC ............... *H02K 5/10* (2013.01); *F04B 17/03* (2013.01); *F04D 25/082* (2013.01); *H02K 5/124* (2013.01); *H02K 5/161* (2013.01); *H02K 5/1732* (2013.01)

(58) Field of Classification Search

CPC .......... H02K 5/10; H02K 5/124; H02K 5/191; H02K 5/1732; F04B 17/03; F04D 25/082

USPC ........................................................... 310/90

See application file for complete search history.

(56) References Cited

U.S. PATENT DOCUMENTS

| | | | |
|---|---|---|---|
| 2,745,660 | A | 5/1956 | Delahay |
| 2,877,099 | A | 3/1959 | Bowles |
| 3,567,020 | A | 5/1971 | Whitaker et al. |
| 3,809,247 | A | 5/1974 | Brett |
| 4,621,981 | A | 11/1986 | Lorett |
| 4,806,083 | A | 2/1989 | LaGrange et al. |

(Continued)

FOREIGN PATENT DOCUMENTS

| | | |
|---|---|---|
| BE | 1014385 | 10/2003 |
| EP | 1843056 | 10/2007 |

(Continued)

*Primary Examiner* — Michael Andrews

(74) *Attorney, Agent, or Firm* — Michael Best & Friedrich LLP

(57) ABSTRACT

An electric machine includes an end frame having a shaft bore extending therethrough. The end frame includes a first side and a second side. A shaft extends through the shaft bore. A bearing is supported by the end frame and is coupled to the shaft to support the shaft for rotation about a longitudinal axis. A first seal is fixedly attached to the end frame and includes an internal bore that is sized to cooperate with the shaft to form a seal point therebetween. The first seal is disposed on the first side of the end frame. A second seal is fixedly attached to the second side of the end frame. The second seal includes a movable portion in direct contact with the shaft to define a second seal point. The first seal point is on a first side of the bearing and the second seal point is on a second side of the bearing.

15 Claims, 5 Drawing Sheets

(56) References Cited

U.S. PATENT DOCUMENTS

| | | | |
|---|---|---|---|
| 4,911,609 | A | 3/1990 | Anderson et al. |
| 5,554,277 | A | 9/1996 | Rief et al. |
| 5,567,134 | A | 10/1996 | Inoue |
| 5,677,584 | A | 10/1997 | Keck |
| 5,720,167 | A | 2/1998 | Marich |
| 5,750,022 | A | 5/1998 | Blake et al. |
| 5,841,607 | A | 11/1998 | Khan et al. |
| 5,893,703 | A | 4/1999 | Weinrib |
| 5,913,548 | A | 6/1999 | Keck |
| 6,133,658 | A | 10/2000 | Fisher et al. |
| 6,172,436 | B1 * | 1/2001 | Subler ...................... H02K 5/10 310/90 |
| 6,247,702 | B1 * | 6/2001 | Long ...................... F16J 15/447 277/417 |
| 6,533,540 | B1 | 3/2003 | Mathis |
| 6,796,860 | B1 | 9/2004 | Takahashi |
| 7,489,059 | B2 | 2/2009 | Yajima |
| 7,866,444 | B2 | 1/2011 | Aldridge |
| 8,196,354 | B2 | 6/2012 | Ota |
| 8,221,092 | B2 | 7/2012 | Chilcoat et al. |
| 2007/0094817 | A1 | 5/2007 | Stoltz et al. |
| 2007/0295557 | A1 | 12/2007 | Aldridge |
| 2010/0109461 | A1 * | 5/2010 | Kato ........................ H02K 5/20 310/90 |
| 2012/0104884 | A1 | 5/2012 | Wagner et al. |

FOREIGN PATENT DOCUMENTS

| | | |
|---|---|---|
| GB | 810115 | 3/1959 |
| GB | 878366 | 9/1961 |
| GB | 985851 | 3/1965 |
| GB | 1594254 | 7/1981 |
| JP | 2000034989 | 2/2000 |
| JP | 2003083344 | 3/2003 |
| JP | 2004360506 | 12/2004 |
| JP | 2004360903 | 12/2004 |
| JP | 2000213321 | 2/2006 |
| JP | 2006118448 | 5/2006 |
| JP | 2007007789 | 1/2007 |
| JP | 2007007790 | 1/2007 |
| JP | 2004312927 | 8/2008 |
| JP | 2001208214 | 9/2009 |
| JP | 2001207995 | 1/2011 |
| JP | 4776851 | 9/2011 |
| WO | 200068575 | 11/2000 |
| WO | 2007055960 | 5/2007 |
| WO | 2008014556 | 2/2008 |
| WO | 2010006364 | 1/2010 |
| WO | 2012061439 | 5/2012 |
| WO | 2012169904 | 12/2012 |

* cited by examiner

SEAL ARRANGEMENT FOR A MOTOR PUMP ASSEMBLY

CROSS REFERENCE TO RELATED APPLICATIONS

This application is a divisional of U.S. patent application Ser. No. 13/790,821 filed Mar. 8, 2013, the entire content of which is incorporated herein by reference.

BACKGROUND

The present invention relates to a multi-seal arrangement for an electric motor. The multi-seal arrangement inhibits the passage of particles or liquids from being introduced to a bearing of the electric motor.

SUMMARY

In one embodiment, the invention provides an electric machine. The electric machine includes an end frame having a shaft bore extending therethrough. The end frame includes a first side and a second side. A shaft extends through the shaft bore. A bearing is supported by the end frame and is coupled to the shaft to support the shaft for rotation about a longitudinal axis. A first seal is fixedly attached to the end frame and includes an internal bore that is sized to cooperate with the shaft to form a seal point therebetween. The first seal is disposed on the first side of the end frame. A second seal is fixedly attached to the second side of the end frame. The second seal includes a movable portion in direct contact with the shaft to define a second seal point. The first seal point is on a first side of the bearing and the second seal point is on a second side of the bearing.

In another embodiment the invention provides an electric machine. The electric machine includes an end frame having a shaft bore extending therethrough. The end frame includes a first side internal to the electric machine and a second side external to the electric machine. A shaft extends through the shaft bore and is rotatable about an axis. A bearing is supported by the end frame and rotatably couples the shaft to the end frame for rotation about the axis. A first seal assembly is disposed around the shaft on the first side of the end frame. The first seal assembly is in non-contact with the shaft and the end frame. A second seal assembly is disposed around the shaft on the second side of the end frame. The second seal member is in direct contact with the shaft and the end frame.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
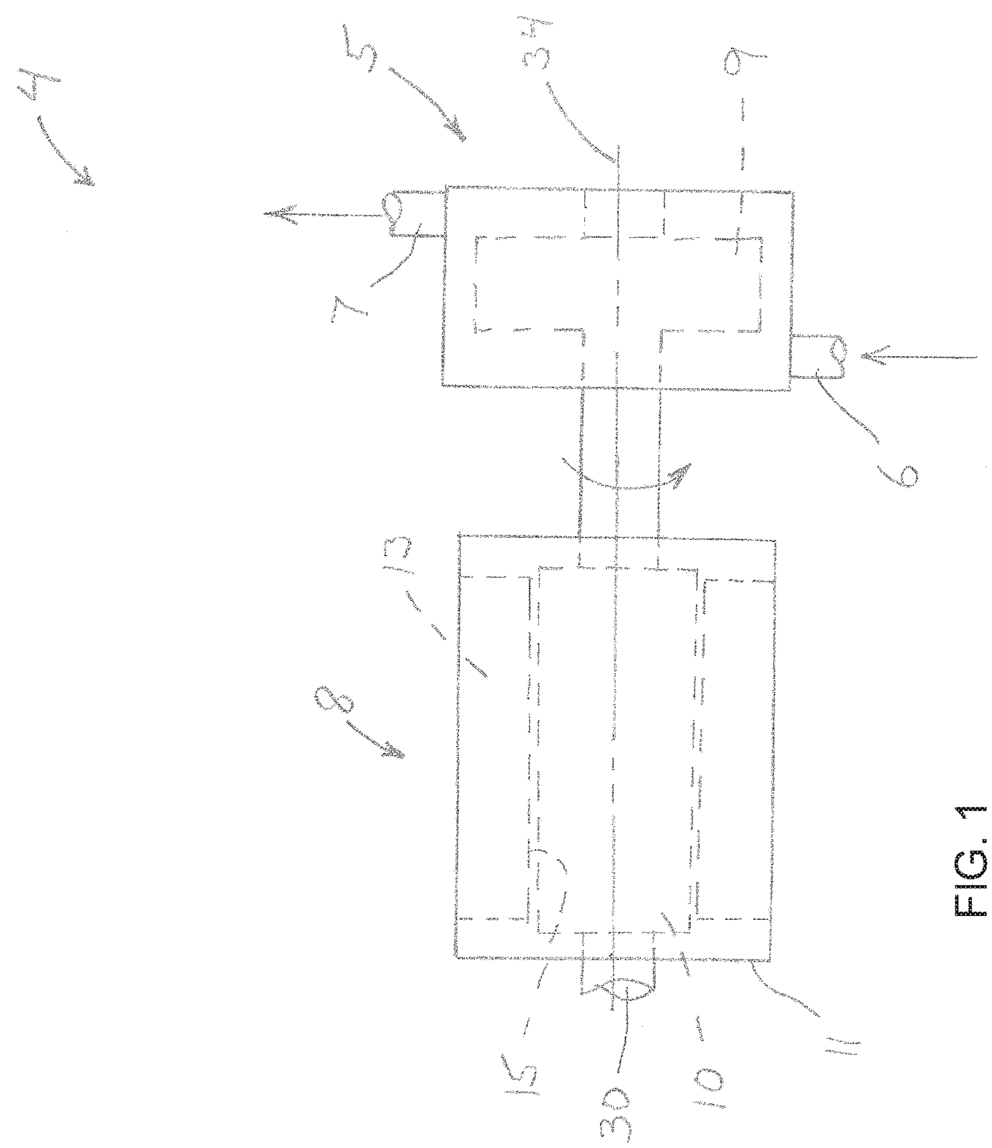
FIG. 1 is a schematic of a motor pump assembly.

FIG. 1 schematically illustrates a motor-pump assembly 4 suitable for use in pumping fluids such as water refrigerant, or other liquids. The motor-pump assembly 4 includes a pump 5 that is directly connected to a motor 8. In most constructions, a coupling element (not shown) is positioned between the motor 8 and the pump 5 to allow for disconnection of the two components. In addition, some constructions may employ a transmission or other speed changing device between the motor 8 and the pump 5 to allow the pump 5 to rotate at a speed different from the motor 8.

The pump 5 includes an inlet 6, an outlet 7, and a rotating element 9 in fluid communication with the inlet 6 and the outlet 7. Rotation of the rotating element 9 draws fluid into the pump 5 via the inlet 6 and discharges the fluid via the outlet 7. The motor 8 is typically an AC powered electric motor such as an open drip proof electric motor that is coupled to the rotating element 9 of the pump. The motor 8 includes a housing 11 and a stator 13 disposed within the housing 11 and fixed with respect to the pump. The stator 13 includes an opening 15 sized to receive a portion of a rotating assembly 10 and is operable to produce a magnetic field that interacts with a magnetic field of the rotating assembly 10 to rotate the rotating assembly 10 and drive the rotating element 9 of the pump 5.

Figure 2:
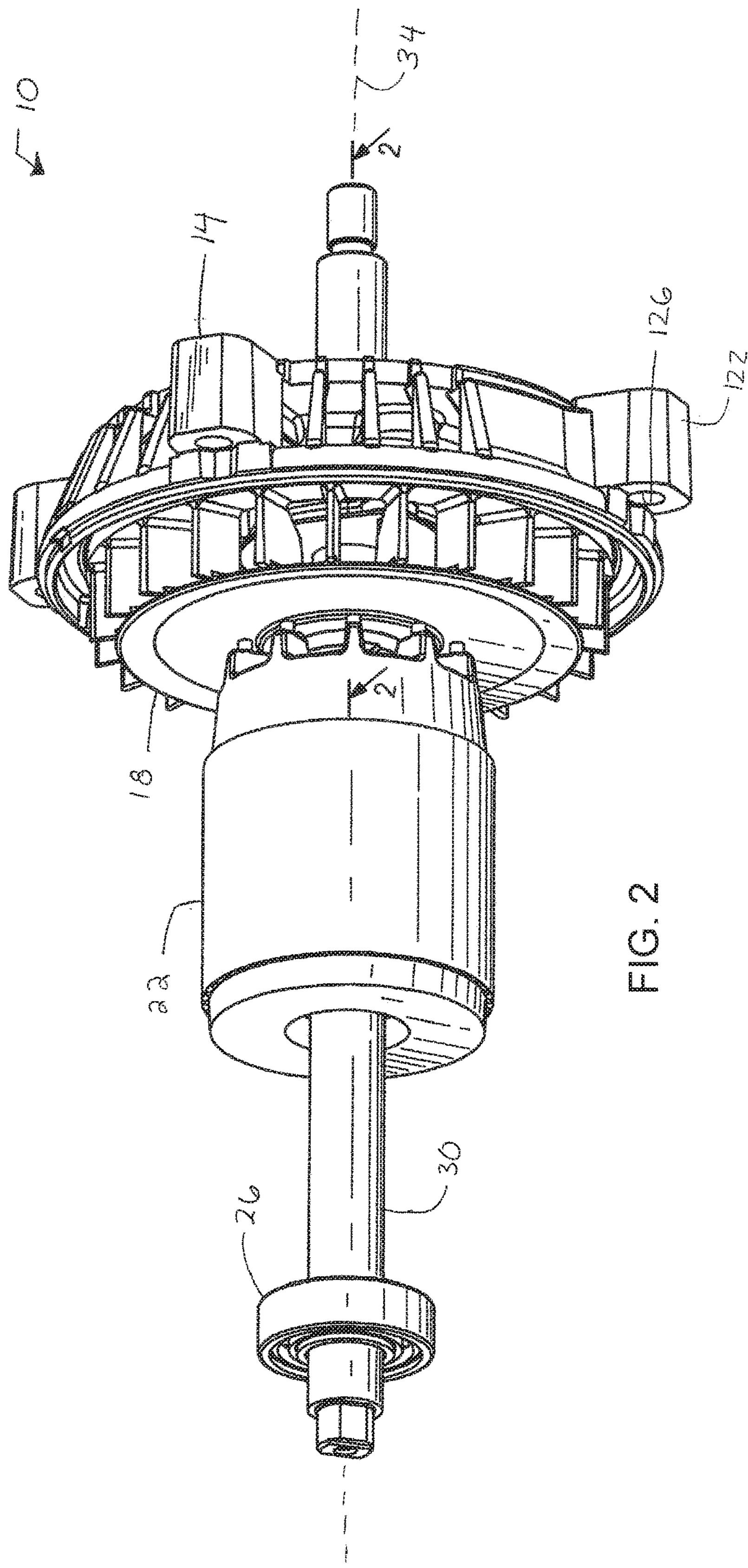
FIG. 2 is a perspective view of a rotating assembly and end frame of an electric motor of the motor pump assembly of FIG. 1.

FIG. 2 illustrates the rotating assembly 10 of the electric motor 8. The rotating assembly 10 attaches to and is at least partially supported for rotation by an end frame 14 that attaches to the housing 11. The rotating assembly 10 includes a fan 18, a rotor 22, and a first bearing 26 disposed about a shaft 30. The fan 18 is fixedly coupled to the shaft 30 adjacent the end frame 14 so that the fan 18 rotates with the shaft 30 and provides cooling of the electric motor 8. In other motors, other types of fans or other fan arrangements may be employed. In some motors, the fan may be omitted entirely.

Figure 5:
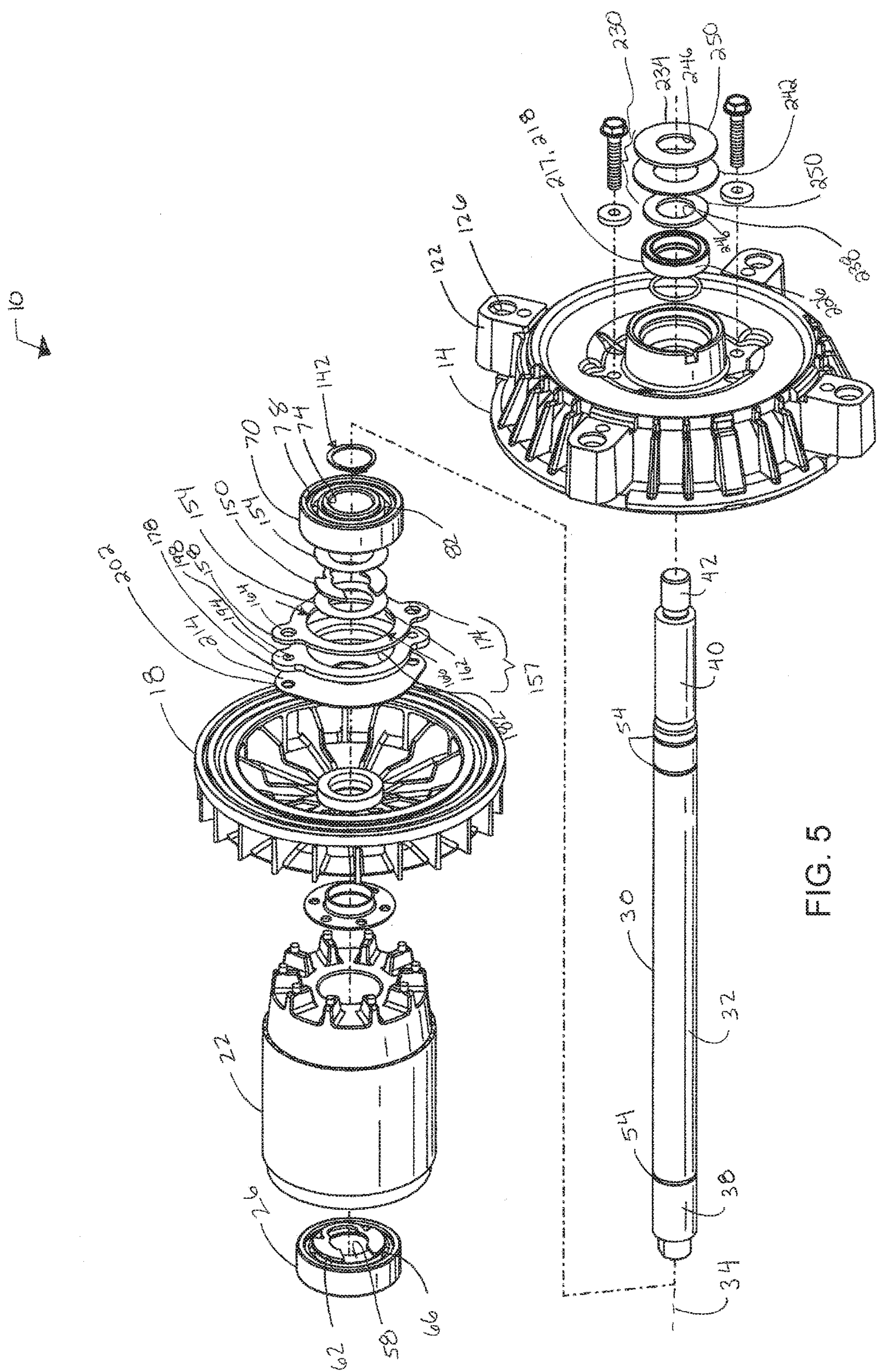
FIG. 5 is an exploded view of the rotating assembly and end frame of the electric motor of FIG. 1.

The shaft 30, best illustrated in FIG. 5, is an elongated substantially cylindrical member 32 that provides rotational support to the rotating components of the motor 8. In the illustrated construction, the shaft 30 extends along a longitudinal axis 34 and includes a first diameter portion 38, a second diameter portion 42, and a third diameter portion 46. The shaft 30 includes an outer surface 50 having three circumferential grooves 54.

A rotor 22 is fixedly supported by the shaft 30 and is rotatable with the shaft 30 and the fan 18 relative to a stator 13. The rotor 22 and the stator 13 can be virtually any arrangement of rotor 22 and stator 13 without effecting the operation of the invention. For example, brushed or brushless DC rotor and stator arrangements or AC rotor and stator arrangements could be employed with the invention described herein. The motor-pump assembly 4 can be applied vertically or horizontally with preferred arrangements being horizontal.

The first bearing 26, illustrated in FIGS. 2 and 5, includes an inner race 58 that is coupled to the shaft 30 for co-rotation, an outer race 62 that engages the motor housing 11 or a second end frame that attaches to the housing 11, and a plurality of rolling-elements 66 that facilitate the relative rotation between the inner race 58 and the outer race 62. As illustrated in FIG. 2, the rolling-elements 66 are balls and the first bearing 26 is a common ball bearing. In other constructions, other types of bearings such as roller bearings, needle bearings, sealed bearings, and the like may be employed.

Figure 4:
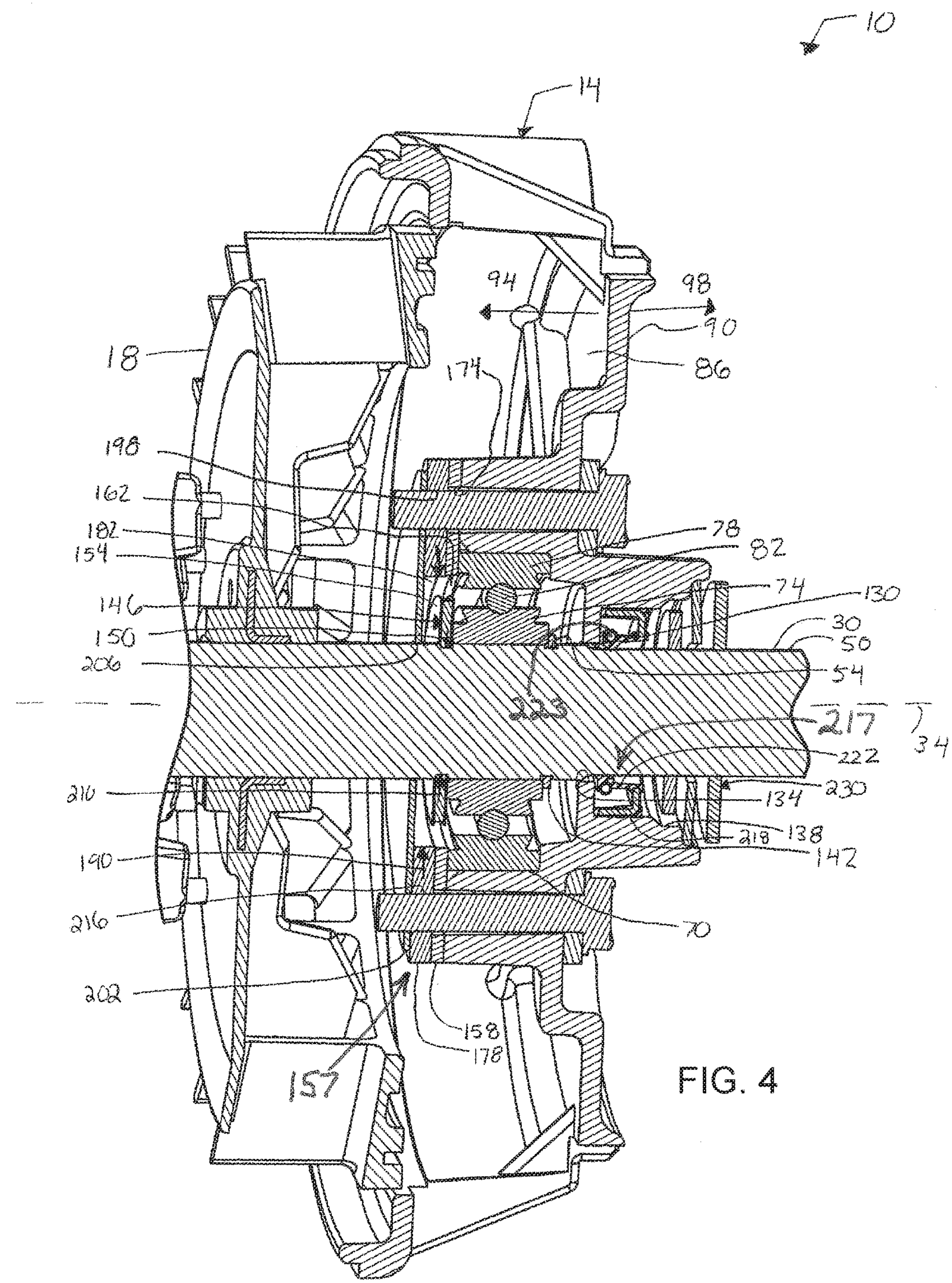
FIG. 4 is a perspective view of a cross section of the electric motor of FIG. 1 along section lines 2-2.

As illustrated in FIGS. 4 and 5, the rotating assembly 10 also includes a second bearing 70 disposed within the end frame 14 as will be discussed below. The second bearing 70 is similar to the first bearing 26 and includes an inner race 74 that is coupled to the shaft 30 for co-rotation, an outer race 78 that engages the end frame 14, and a plurality of rolling-elements 82 that facilitate the relative rotation between the inner race 74 and the outer race 78. As illustrated in FIG. 4, the rolling-elements 82 are balls and the second bearing 70 is a common ball bearing. In other constructions, other types of bearings such as roller bearings, needle bearings, sealed bearings, and the like may be employed.

Figure 3:
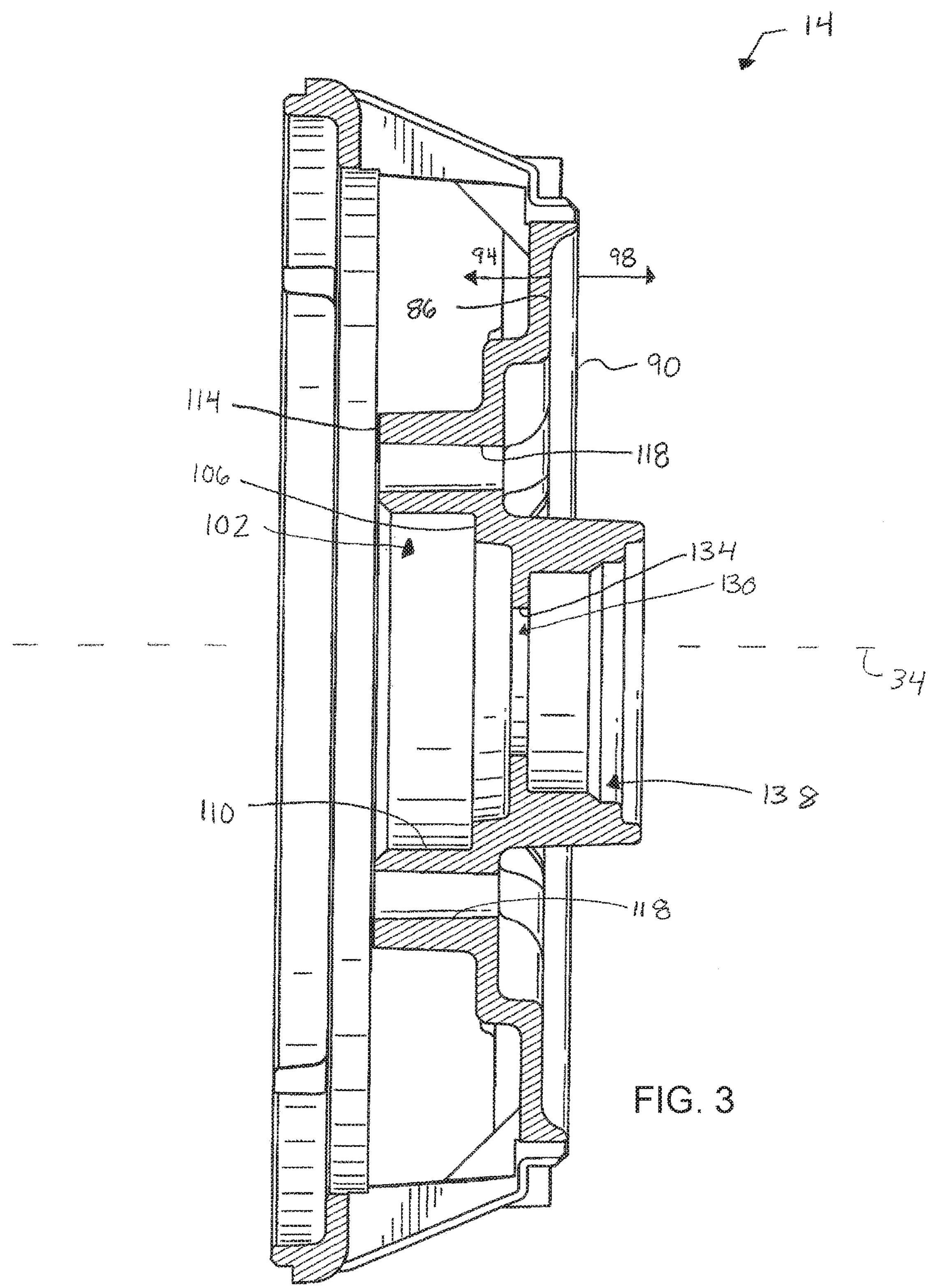
FIG. 3 is a front cross section of an end frame of the electric motor of FIG. 1 along section lines 2-2.

Referring to FIG. 3, the end frame 14 is generally made of cast aluminum but may be any type of material suitable for use with motors. The end frame 14 includes an inner, generally planar wall face 86 and an outer, generally planer, wall face 90. The inner wall face 86 is disposed on and faces an inside 94 of the electric motor 8, and the outer wall face 90 is disposed on and faces an outside 98 of the electric motor 8. As shown in FIG. 3, the end frame 14 further includes a generally cylindrical bearing cavity 102 which extends inward into the end frame 14 and surrounds the longitudinal axis 34. The bearing cavity 102 includes an annular shoulder 106 thereby defining a bearing seat 110 located within the end frame 14. A first annular surface 114 is defined at one end of the bearing cavity 102 and extends perpendicular to the longitudinal axis 34. Two apertures 118 extend from the first annular surface 114 through the end frame 14 parallel to the longitudinal axis 34. A plurality of flanges 122, shown in FIG. 5, extend outwardly from the end frame 14 and define holes 126 through which bolts or screws (not shown) may extend to couple the end frame 14 to the motor housing 11.

The end frame 14 also includes a cylindrical shaft bore 130 that extends through the end frame 14 and extends around the longitudinal axis 34. The shaft bore 130 is sized to allow the shaft 30 to extend through the shaft bore 130. The shaft bore 130 is sized such that the shaft 30 does not come into contact with a cylindrical surface 134 of the bore 130 which closely surrounds the rotatable shaft 30. The shaft outer surface 50 and the cylindrical surface 134 of the bore 130 are slightly spaced apart so as to permit free relative rotation therebetween.

The end frame 14 also includes a recessed portion 138 disposed on the outside 98 of the end frame 14 which extends inward into the end frame 14 and surrounds the shaft bore 130. The recessed portion 138 is preferably a cylindrically shaped stepped recess which surrounds the axis 34.

With reference to FIGS. 4 and 5, a snap ring 142 is coupled to the shaft 30 adjacent the second bearing 70 to inhibit axial movement of the second bearing 70 in a first direction. The snap ring 142 is partially recessed within one of the circumferential grooves 54 on the shaft 30. A C-clip assembly 146 is disposed about the shaft 30 adjacent the second bearing 70 to inhibit axial movement of the second bearing 70 in a second direction. The C-clip assembly 146 includes a C-clip 150 disposed between a pair of circular plates 154. The C-clip assembly 146 is coupled to the shaft 30 and is partially recessed within another one of the circumferential grooves 54 on the shaft 30.

As shown in FIGS. 4 and 5, the end frame 14 supports three seal assemblies. A first seal assembly 157 includes a first annular disk 158 disposed about the shaft 30 adjacent the end frame 14. The first annular disk 158 includes a bore aperture 162 through which the shaft 30 extends. The bore aperture 162 has a diameter 166 that is greater than any of the diameter portions 38, 42, 46 of the shaft 30 such that the first annular disk 158 does not contact the shaft 30. The first annular disk 158 abuts the first annular surface 114 of the end frame 14 and the outer race 78 of the second bearing 70 to form a seal to inhibit particles or liquid from reaching the second bearing 70. The first annular disk 158 includes a pair of flanges 164 extending radially outwardly. The flanges 170 each include a through hole 174. In the illustrated embodiment, the first annular disk 158 is made of rubber, but may be made of an alternate resilient material.

The first seal assembly 157 also includes a bearing lock plate 178 disposed around the shaft 30 on the inside 94 of the end frame 14. The bearing lock plate 178 is in direct contact with the first annular disk 158 and includes a bore aperture 182 through which the shaft 30 extends. The bore aperture 186 has a diameter 190 that is greater than any of the diameter portions 38, 42, 46 of the shaft 30 such that the bearing lock plate 178 does not contact the shaft 30. The bearing lock plate 178 includes a pair of flanges 194 extending radially outwardly and positioned to align with the flanges 164 of the first annular disk 158. The flanges 194 each include a threaded hole 198 that are each in alignment with the through holes 174 of the first annular disk 158.

The first seal assembly 157 also includes a second annular disk 202 disposed about the shaft 30 adjacent to the bearing lock plate 178 on the inside 94 of the end frame 14. The second annular disk 190 is coupled to the bearing lock plate 170 with an adhesive with alternative attachment means being possible. The second annular disk 190 includes a bore aperture 206 sized for receiving the shaft 30. The bore aperture 206 has a diameter 210 greater than any of the diameter portions 38, 42, 46 of the shaft 30 and smaller than the diameter 166 of the first annular disk 158. In preferred arrangements, the diameter 210 is slightly larger than the shaft (e.g., 0.005-0.020 inches). Thus, the second annular disk 202 cooperates with the shaft 30 to form a non-contact seal. A lubricant (not shown) is place on the shaft 30 between the shaft 30 and the second annular disk 202 to enhance the seal. The non-contact seal inhibits particles or liquid from reaching the second bearing 70 from the inside 94 of the end frame 14. In the illustrated embodiment, the second annular disk 202 is made of rubber, but may be made of an alternate resilient material. The second annular disk 202 includes a pair of flanges 214 that extend radially outwardly. The flanges 214 each include a through hole 216 that are each in alignment with the through holes 174 of the first annular disk 158 and the threaded holes 198 of the bearing lock plate 178.

As shown in FIG. 4, a second seal assembly 217 includes a radial shaft seal, or lip seal 218, coupled to the outside 98 of the end frame 14 and recessed in the recessed portion 138 of the end frame 14. The lip seal 218 includes an inner surface 222 and an outer surface 226 (FIG. 5). The outer surface 226 is in direct contact with the end frame 14. The inner surface 222 includes a movable portion in direct contact with the shaft 30 to form a seal. A biasing member such as a spring 223 positioned to bias the inner surface 222 into contact with the shaft 30. In the illustrated embodiment, the lip seal 218 is made of rubber, but may be made of an alternate resilient material. The lip seal 218 inhibits particles or liquid from reaching the second bearing 70 from the outside 98 of the end frame 14.

A third seal assembly 230 is positioned on the outside 98 of the end frame 14 and is positioned adjacent the lip seal 218. The third seal assembly 230 includes a first disk 234, a second disk 238, and a third disk 242 as shown in FIG. 4.

The first disk 234 and second disk 238 include an inner surface 246 and an outer surface 250. The inner surfaces 246 are fixedly attached to the shaft 30. The third disk 242 is disposed between the first disk 234 and second disk 238 and includes an inner surface 254 and an outer surface 258. The outer surface 258 of the third disk 242 is fixedly attached to the end frame 14 and does not contact the shaft 30. The third seal assembly 230 inhibits particles or liquid from reaching the lip seal 218, and ultimately from reaching the second bearing 70, from the outside 98 of the end frame 14.

To assemble the electric machine, the shaft 30, the rotor 22, and the fan 18 are fixedly coupled to one another for co-rotation. Many options are available to connect the rotor 22 and the fan 18 to the shaft 30 including shrink fits, keys and slots, splines, welding, brazing, soldering, adhesives, etc. The method selected for attaching the rotor 22 and the fan 18 to the shaft 30 is not critical to the operation of the invention. The first seal assembly 157, including the first annular disk 158, the bearing lock plate 178, and the second annular disk 202 are slid over the shaft 30 to a position between the second bearing 70 position and the fan 18. In preferred constructions, the first annular disk 158 and the second annular disk 202 are adhesively bonded to the bearing lock plate 178. The C-clip assembly 146 is coupled to the shaft 30 in the innermost groove 54 adjacent the location of the second bearing 70. The second bearing 70 is then slid (or pressed) onto the shaft 30 and the snap ring 142 is placed in the outermost groove 54 to fix the axial position of the second bearing 70 on the shaft 30. The end frame 14 is placed over the bearing 70 such that the outer race 78 of the bearing 70 engages the annular shoulder 106. The first seal assembly 157 attaches to the end frame 14 such that the first annular disk 158 is in contact with the first annular surface 114. The bearing lock plate 178 is positioned in contact with the first annular disk 158 such that fasteners 262 can pass through the first annular disk 158 and engage the threaded holes 198 in the bearing lock plate 178. As the fasteners 262 are tightened, the bearing lock plate 178 is pulled toward the first annular surface 114, thereby compressing the first annular disk 158 between the bearing lock plate 178 and the end frame 14 to improve the seal therebetween. The second annular disk 202 attaches via an adhesive or other suitable attachment means to the bearing lock plate 178 to complete the assembly of the first seal assembly 157 on the inside 94 the end frame 14 and on the inside of the bearing 70. Thus, the first seal assembly 157 encloses a space around an inside of the second bearing 70. As discussed, the first seal assembly 157 effectively inhibits the entry of unwanted material into the second bearing 70 from the inside 94 of the end frame 14. The second seal assembly 217, including the lip seal 218 is inserted into the space between the end frame 14 and the shaft 30 such that the movable portion contacts the shaft 30 and forms a seal. The third seal assembly 230 is assembled outside of the second seal assembly 217 to complete the assembly of the electric motor 8. Thus, the second seal assembly 217 and the third seal assembly 230 enclose a space around the outside of the second bearing 70. While the assembly is described in a particular order, other component arrangements may be considered.

In operation, the rotor 22 and the stator cooperate as is well known in the art to produce rotation of the shaft 30. The first bearing 26 and the second bearing 70 support the shaft 30, the fan 18, and the rotor 22 for the desired rotation. During operation, the outside 98 of the motor 8 can be exposed to debris such as water, dirt, dust, etc. The third seal assembly 230 provides a first barrier of entry for this debris. The arrangement of the third seal assembly 230 makes the passage of debris more unlikely. However, should debris pass through the third seal assembly 230, the debris is inhibited from further passage by the second seal assembly 217. The second seal assembly 217 is in direct contact with the end frame 14 and the shaft 30 such that the passage of debris is very difficult. Should debris pass the second seal assembly 217, it must still pass through the small opening between the end frame 14 and the shaft 30 adjacent the second seal assembly 217. Thus, the second seal assembly 217 and the third seal assembly 230 cooperate to inhibit the entry of debris into the second bearing 70 from the outside 98 of the end frame 14. The first seal assembly 157 is positioned to inhibit the entry of debris into the second bearing 70 from the inside 94 of the end frame 14. The first annular disk 158 of the first seal assembly 157 forms a seal between the bearing lock plate 178 and the end frame 14 via the compression provided by the bearing lock plate 178. In addition, the second annular disk 202 is sealingly coupled to the bearing lock plate 178 to inhibit the entry of debris around the interfaces provided by the bearing lock plate 178 and the second annular disk 202. The bore aperture 190 of the second annular disk 202 is sized to provide a small opening between the shaft 30 and the second annular disk 202. The size of the opening is small enough to inhibit the entry of debris. In addition, any lubricant on the shaft 30 cooperates with the second annular disk 202 to effectively limit the size of the gap. Thus, the rotating assembly 10 includes three seal assemblies 157, 217, 230 that cooperate to seal the space in which the second bearing 70 is disposed to protect the second bearing 70 from unwanted debris.

Various features and advantages of the invention are set forth in the following claims.

What is claimed is:

1. An electric machine comprising:

an end frame having a shaft bore extending therethrough;

a shaft extending through the shaft bore;

a bearing supported by the end frame and coupled to the shaft to support the shaft for rotation about a longitudinal axis, the bearing defining a first side and a second side;

a first seal assembly fixedly attached to the end frame and including an internal bore that is sized to cooperate with the shaft to form a seal point therebetween, the first seal assembly disposed on the first side of the bearing; and a second seal assembly fixedly attached to the end frame, the second seal assembly including a movable portion in direct contact with the shaft to define a second seal point, wherein the second seal assembly is on the second side of the bearing, wherein the first seal assembly includes a first seal member in direct contact with the end frame and the bearing, a bearing lock plate in direct contact with the first seal member, and a second seal member in direct contact with the bearing lock plate and including the internal bore.

2. The electric machine of claim 1, wherein the bearing includes an outer race in contact with the end frame and an inner race in contact with the shaft, and wherein the first seal assembly is in direct contact with the outer race.

3. The electric machine of claim 1, wherein the first seal member and the second seal member are formed from a resilient material.

4. The electric machine of claim 3, wherein the first seal member and the second seal member are adhesively bonded to the bearing lock plate.

5. The electric machine of claim 1, further comprising a fastener that threadably engages the bearing lock plate to fixedly attach the first seal member and the second seal member to the end frame.

6. The electric machine of claim 1, wherein the internal bore and the shaft are sized to define an annular space therebetween, and wherein a layer of lubricant is positioned on the shaft adjacent the internal bore, the lubricant cooperating with the second seal member to seal the annular space.

7. The electric machine of claim 1, wherein the second seal assembly includes a lip seal having a lip that contacts the shaft and a biasing element coupled to the lip to bias the lip into contact with the shaft.

8. The electric machine of claim 1, further comprising a third seal assembly coupled to the end frame and positioned such that the second seal assembly is between the third seal assembly and the bearing.

9. The electric machine of claim 8, wherein the third seal assembly includes a first disk fixedly attached to the shaft, a second disk fixedly attached to the shaft, and a third disk fixedly attached to the end frame and positioned between the first disk and the second disk.

10. The electric machine of claim 1, wherein the end frame includes a plurality of apertures positioned on a lower side of the end frame such that the electric machine is an open drip proof motor.

11. A pumping apparatus comprising:

a pump including an inlet, an outlet, and a rotating element in fluid communication with the inlet and the outlet;

a motor coupled to the rotating element in a driving relationship to rotate the rotating element, the motor including, a stator fixed with respect to the pump;

a rotor positioned adjacent the stator and operable to rotate in response to the application of an electric current to the motor;

a shaft coupled to the rotor to support the rotor for rotation and coupled to the pump to rotate the rotating element;

an end frame positioned between the rotor and the pump and fixedly attached to the stator;

a bearing coupled to the end frame and the shaft to support the shaft for rotation, the bearing defining a first side between the bearing and the rotor and a second side between the bearing and the pump;

a first seal assembly coupled to the end frame and positioned between the bearing and the rotor, the first seal assembly cooperating with the shaft and the end frame to substantially enclose the first side of the bearing;

a second seal assembly coupled to the end frame and positioned between the first bearing and the pump, the second seal assembly in direct contact with the shaft and the end frame to substantially enclose the second side of the bearing; and a third seal assembly coupled to the end frame and positioned between the second seal assembly and the pump, wherein the first seal assembly includes a first seal member in direct contact with the end frame and the bearing, a bearing lock plate in direct contact with the first seal member, and a second seal member in direct contact with the bearing lock plate and including an internal bore.

12. The pumping apparatus of claim 11, wherein the first seal member and the second seal member are formed from a resilient material and are adhesively bonded to the bearing lock plate.

13. The pumping apparatus of claim 11, wherein the internal bore and the shaft are sized to define an annular space therebetween, and wherein a layer of lubricant is positioned on the shaft adjacent the internal bore, the lubricant cooperating with the second seal member to seal the annular space.

14. The pumping apparatus of claim 11, wherein the second seal assembly includes a lip seal having a lip that contacts the shaft and a biasing element coupled to the lip to bias the lip into contact with the shaft.

15. The pumping apparatus of claim 11, wherein the third seal assembly includes a first disk fixedly attached to the shaft, a second disk fixedly attached to the shaft, and a third disk fixedly attached to the end frame and positioned between the first disk and the second disk.

* * * * *